United States Patent
Hawksworth et al.

(10) Patent No.: US 10,677,194 B2
(45) Date of Patent: Jun. 9, 2020

(54) SOLENOID ACTUATED TINE LOCK

(71) Applicant: Goodrich Actuation Systems Limited, Solihull, West Midlands (GB)

(72) Inventors: Andrew Hawksworth, Moreton (GB); Anthony Morgan, Wolverhampton (GB)

(73) Assignee: GOODRICH ACTUATION SYSTEMS LIMITED, West Midlands (GB)

(*) Notice: Subject to any disclaimer, the term of this patent is extended or adjusted under 35 U.S.C. 154(b) by 331 days.

(21) Appl. No.: 15/668,768

(22) Filed: Aug. 4, 2017

(65) Prior Publication Data
US 2018/0038312 A1 Feb. 8, 2018

(30) Foreign Application Priority Data
Aug. 4, 2016 (EP) ..................... 16182729

(51) Int. Cl.
| F02K 1/76 | (2006.01) |
| F16H 25/24 | (2006.01) |
| F16H 25/20 | (2006.01) |
| H01F 7/06 | (2006.01) |

(52) U.S. Cl.
CPC .............. *F02K 1/763* (2013.01); *F02K 1/766* (2013.01); *F16H 25/2454* (2013.01); *F05D 2250/41* (2013.01); *F05D 2260/30* (2013.01); *F16H 25/20* (2013.01); *F16H 2025/2081* (2013.01); *F16H 2025/2084* (2013.01); *H01F 7/06* (2013.01)

(58) Field of Classification Search
CPC .......... F02K 1/766; F02K 1/763; F16H 25/20; F16H 25/2454
See application file for complete search history.

(56) References Cited

U.S. PATENT DOCUMENTS

| 2007/0220998 A1* | 9/2007 | Kopecek ................. B64C 13/28 74/89.39 |
| 2010/0089029 A1 | 4/2010 | Somerfield et al. |
| 2012/0172174 A1* | 7/2012 | Kopecek ................. F02K 1/763 475/329 |

FOREIGN PATENT DOCUMENTS

| EP | 0801221 A2 | 10/1997 |
| EP | 2107273 A2 | 10/2009 |
| EP | 2149496 A1 | 2/2010 |

OTHER PUBLICATIONS

European Search Report for International Application No. 16182729.0 filed Feb. 2, 2017, 8 pages.

* cited by examiner

*Primary Examiner* — Andrew H Nguyen
(74) *Attorney, Agent, or Firm* — Cantor Colburn LLP

(57) ABSTRACT

There is provided an actuator for use in a thrust reverser of an aircraft, comprising a screw shaft and a nut translatable along the shaft between a retracted position and an extended position, a tine component comprising tine fingers formed with projections that are configured to engage formations on the nut when the nut occupies its retracted position to secure the nut against axial movement, and a movable lock member engageable with the tine fingers to restrict radial movement of the tine fingers in a first position, the lock member movable between the first position and a second position in which the lock member does not restrict radial movement of the tine fingers. The lock member is movable between the first position and the second position by means of an electromagnetic actuator.

12 Claims, 2 Drawing Sheets

SOLENOID ACTUATED TINE LOCK

FOREIGN PRIORITY

This application claims priority to European Patent Application No. 16182729.0 filed Aug. 4, 2016, the entire contents of which is incorporated herein by reference.

FIELD

The present disclosure relates generally to an actuator for a thrust reverser, wherein the actuator comprises a locking mechanism comprising tine components that are movable using a solenoid.

BACKGROUND

A tine lock is typically used in an actuator for a thrust reverser and conventionally has been moved using hydraulics. When the actuator is deployed the tine lock may be controlled by translating a lock sleeve collar using differential hydraulic pressure. Increasingly, actuators for thrust reversers are being developed that employ electrical, as opposed to hydraulic actuation and it is desired to improve the locking mechanisms of such actuators to prevent unwanted deployment of the thrust reverser.

It is desired to provide improve the mechanisms used in thrust reverser actuators.

SUMMARY

According to an aspect of the disclosure there is provided an actuator for use in a thrust reverser of an aircraft is disclosed. The reverser includes: a screw shaft and a nut translatable along the shaft between a retracted position and an extended position; a tine component comprising tine fingers formed with projections that are configured to engage formations on the nut when the nut occupies its retracted position to secure the nut against axial movement; and a movable lock member engageable with the tine fingers, the lock member movable between a first position and a second position, wherein in the first position the lock member is configured to restrict radial movement of the tine fingers and secure the nut against axial movement, and in the second position the lock member does not restrict radial movement of the tine fingers. The lock member is axially movable between the first position and the second position by means of an electromagnetic actuator.

Provision of such a locking mechanism has been found to lead to improvements in thrust reverser actuators when attempting to prevent undesired deployment.

Rotation of the screw shaft may cause the formations on the nut to be urged against the projections on the tine fingers.

When the lock member is in the first position, the projections on the tine fingers may be prevented from moving (e.g., in a radial direction), such that the formations on the nut cannot move past the projections on the tine fingers, so that the nut is secured against axial movement.

When the lock member is in the second position, the tine fingers are not restricted from radial movement, and the projections on the tine fingers may be urged, deflected or otherwise caused to move in a radial direction and out of the path of the formations on the nut. This allows the nut to move in an axial direction and optionally actuate the thrust reverser.

The actuator may further comprise a biasing member, for example a spring, located between the lock member and the nut, wherein the lock member may be resiliently biased towards the first position using the biasing member.

The biasing member may be located concentrically around the nut and a movable abutment may be provided between the biasing member and the lock member to bias the lock member towards the first position when the nut occupies its retracted position.

The actuator may be arranged and configured such that the force exerted by the biasing member on the lock member decreases as the nut moves away from its retracted position.

A shoulder may be provided on the nut and may be configured to contact the movable abutment after the nut has moved away from its retracted position by a predetermined distance, such that the biasing member and abutment may be carried by the nut as the nut moves towards its extended position.

The lock member and/or tine component may be non-rotating. The lock member and/or tine component may be fixed in position and/or may not move axially, for example with the nut.

The tine fingers may be arranged and configured to deflect in a radial direction away from the nut upon axial movement of the nut away from its retracted position. For example, the tine fingers may be movable in a radial direction away from the nut and/or may be configured to move in this direction when a force is applied thereto that has a component in a radial direction away from the nut.

The formations may comprise a ramped surface and may be arranged and configured to deflect the tine fingers in the radial direction away from the nut upon axial movement of the nut away from its retracted position.

The screw shaft may be rotatable about an axis, and the axis may be a central and/or longitudinal axis of the actuator.

The lock member may be movable along the axis between the first position and the second position.

According to an aspect of the disclosure there is provided a thrust reverser actuation system ("TRAS") comprising an actuator as described above.

The thrust reverser actuation system may not be deployed when the nut occupies its retracted position, and the thrust reverser actuation system may be deployed when the nut occupies its extended position.

According to an aspect of the disclosure there is provided a method of actuating a thrust reverser of an aircraft. The method includes: providing a screw shaft and a nut translatable along the shaft between a retracted position and an extended position; securing the nut against axial movement when the nut occupies its retracted position by engaging formations on the nut with projections located on tine fingers of a tine component, and restricting radial movement of the tine fingers using a movable lock member in a first position; releasing the nut for axial movement by moving the lock member to a second position in which radial movement of the tine fingers is not restricted by the lock member; and moving the lock member from the first position to the second position by means of an electromagnetic actuator.

BRIEF DESCRIPTION OF THE DRAWINGS

Various embodiments will now be described, by way of example only, and with reference to the accompanying drawings in which.

DETAILED DESCRIPTION

The present disclosure relates to actuators for use in a thrust reverser actuation system ("TRAS"), in which a thrust reversing component, for example a flap or vane is moved between a retracted position, in which the engine is providing forward thrust to an aircraft, and a deployed position, in which the engine is providing a reverse thrust. A mechanism is provided in order to lock the actuator against unwanted movement to its deployed position.

Figure 1:
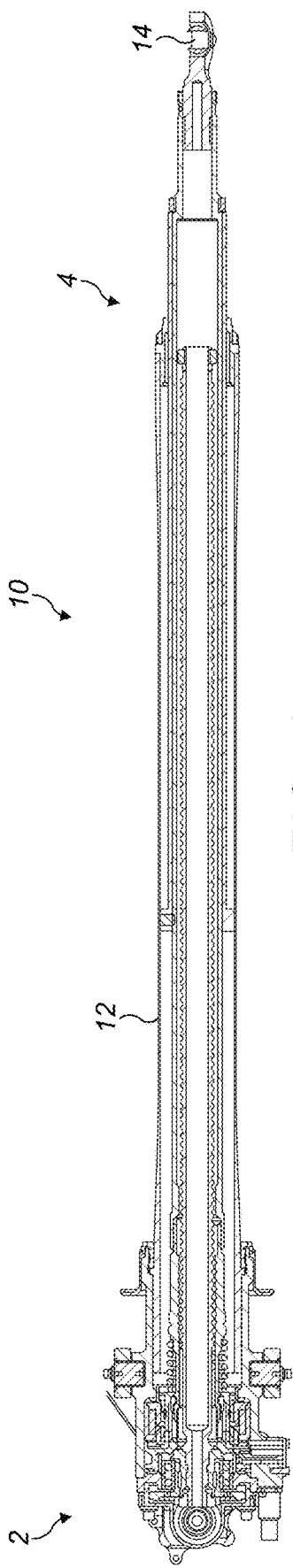
FIG. 1 shows a thrust reverser actuator in its retracted position.

FIG. 1 shows an actuator 10 comprising a shaft 12 that houses one or more movable components, discussed below. At a first end 2 of the actuator 10 there is provided a number of mechanisms that are configured to move the movable components and deploy a thrust reverser (not shown). The deployment of the thrust reverser is achieved using axial movement of an actuation or output component 14 located at a second, opposite end 4 of the actuator 10.

Figure 2:
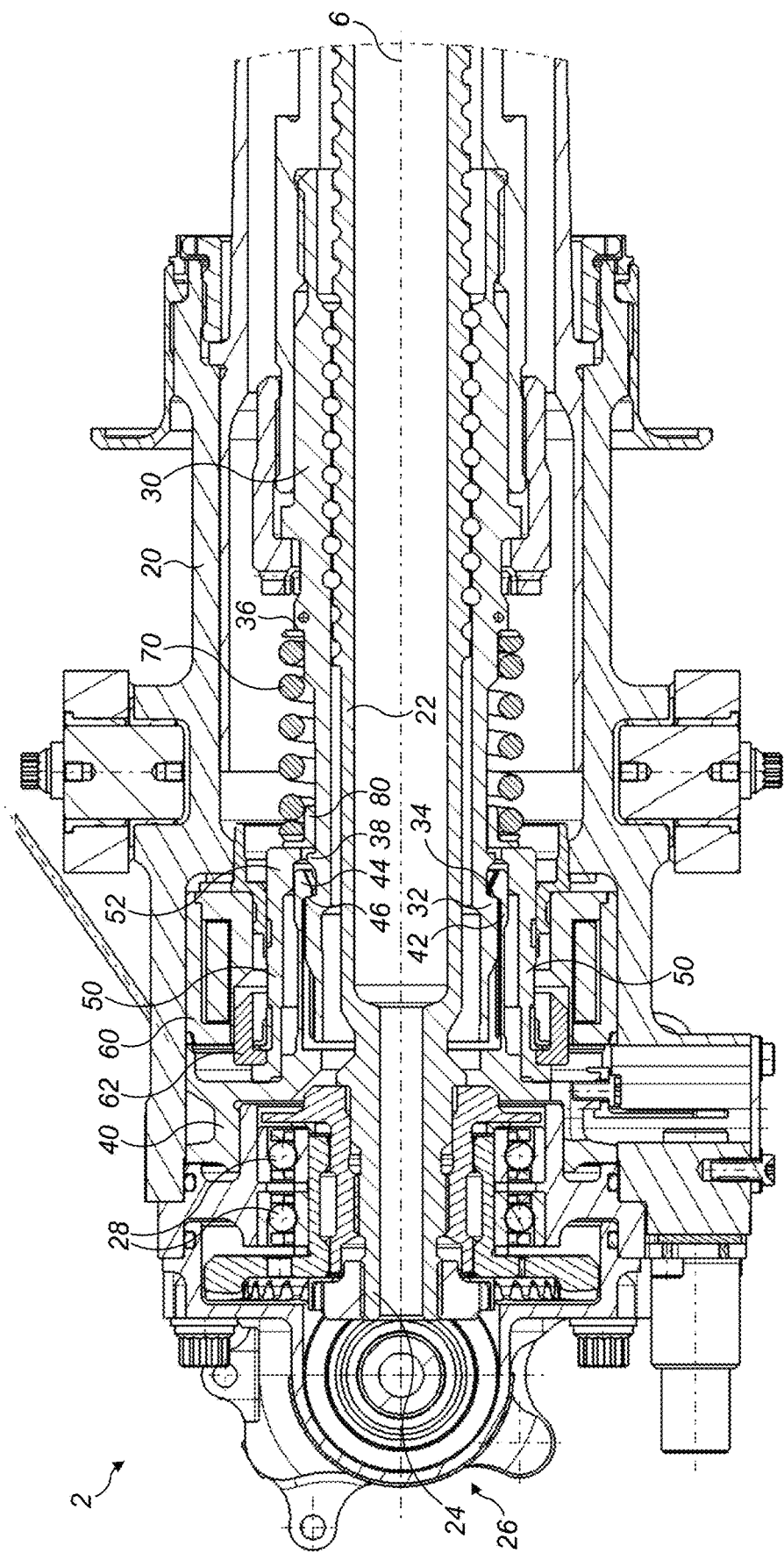
FIG. 2 shows a close up of the movement and locking mechanisms used in the thrust reverser actuator of FIG. 1.

FIG. 2 shows a close up of the first end 2 of the actuator 10, which comprises a housing 20, within which is located a rotatable screw shaft 22 connected at a first end 24 thereof to an electric motor 26. The first end 24 of the screw shaft 22 is rotatably mounted between bearings 28 such that rotation of the electric motor 26 causes rotation of the screw shaft 22 as is known in the art.

A nut 30 is coupled to the screw shaft 22 such that rotational movement of the screw shaft 22 around a common axis of rotation 6 causes corresponding axial movement of the nut 30. This, in turn, causes corresponding axial movement of the output component 14 and deployment of the thrust reverser. The nut 30 does not rotate and is configured to translate along the screw shaft 22 to drive the actuator 10.

FIG. 2 shows the nut in its retracted position and locked against axial movement. The mechanism for locking the nut 30 (and actuator 10) comprises a tine component 40, lock member 50 and a solenoid 60.

The tine component 40 is fixed to the housing 20 and does not rotate. The tine component 40 comprises tine fingers 42 that are located around the nut 30 when the nut 30 occupies its retracted position. The tine fingers 42 are resilient and are movable radially towards and away from the nut 30. However, when the nut 30 occupies its retracted position the tine fingers 42 are prevented from movement, i.e., radial movement by the lock member 50 as described herein.

It will be appreciated that, other than their slight radial movement, the tine fingers 42 are fixed with respect to the remaining portions of the apparatus. For example, the tine fingers 42 do not move axially with the nut.

The tine fingers 42 comprise projections 44 that are configured to engage formations 32 on the nut 30, when the nut 30 occupies its retracted position. A surface 46 on each projection 44 abuts a corresponding surface 34 on the formations 32, and this secures the nut 30 against axial movement when the nut 30 occupies its retracted position and the lock member 50 is in a first, locking position as described below.

The lock member 50 occupies a first, locking position as shown in FIG. 2. The lock member 50 comprises shoulders 52 that prevent radial movement of the tine fingers 44. If the motor 26 is activated to cause rotation of the screw shaft 22, or the nut 30 is otherwise caused to translate axially in the direction of actuation, then the surface 34 on the formations 32 is pressed against the surface 46 on each projection 44. The surfaces 34, 46 are sloped, such that pressure of the surface 34 against surface 46 leads to a force on the tine fingers 44 that is radially outward, away from the nut 30. However, as the shoulders 52 of the lock member 50, in its first position, are located around the tine fingers 44 this prevents them actually moving in this direction.

A spring 70 is located between the lock member 50 and the nut 30, and is configured to urge the lock member 50 towards its first, or locked position. The spring 70 sits between a shoulder 36 of the nut 30 and a movable stop 80, such that the spring 70 urges the movable stop 80 against the lock member 50 when the nut 30 occupies its retracted position.

A solenoid 60 is provided that is arranged and configured to move the lock member 50 from the first position, as shown in FIG. 2, to a second, released position. When the solenoid is energised, a translating portion 62 that is connected to the lock member 50 moves axially so as to cause the lock member 50 to move axially against the action of the spring 70. This means that the shoulders 52 of the lock member 50 move out of alignment with the tine fingers 44, allowing their radial movement away from the nut 30.

To deploy the mechanism and cause actuation of the thrust reverser, the lock member 50 is moved to its second, released position. The motor 36 is activated and causes the screw shaft 22 to rotate so that the nut translates axially in the direction of actuation. The surface 34 on the formations 32 is pressed against the surface 46 on each projection 44, which causes the tine fingers 44 to ride along the surface 34 on the formations 32 and move radially away from the nut 30. This means that the nut 30 is free to continue movement in the direction of actuation.

A projection 38 is provided around the nut 30 proximate to the formations 32, such that the movable stop 80 abuts the projection 38 once the nut 30 has moved axially by a given distance. This adds control to the movable stop and prevent it from interfering with other components of the apparatus.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An actuator for use in a thrust reverser of an aircraft, comprising:
   a screw shaft and a nut translatable along the shaft between a retracted position and an extended position;
   a tine component comprising tine fingers formed with projections that are configured to engage formations on the nut when the nut occupies its retracted position to secure the nut against axial movement;
   a movable lock member engageable with the tine fingers, the lock member movable between a first position and a second position, wherein in the first position the lock member is configured to restrict radial movement of the tine fingers to secure the nut against axial movement, and in the second position the lock member does not restrict radial movement of the tine fingers,
   wherein the lock member is movable between the first position and the second position by means of an electromagnetic actuator;
   a biasing member located between the lock member and the nut, wherein the lock member is resiliently biased towards the first position using the biasing member,
   wherein the biasing member is located concentrically around the nut and a movable abutment is provided between the biasing member and the lock member to bias the lock member towards the first position when the nut occupies its retracted position.

2. An actuator as claimed in claim 1, arranged and configured such that the force exerted by the biasing member on the lock member decreases as the nut moves away from its retracted position.

3. An actuator as claimed in claim 1, wherein a shoulder is provided on the nut and is configured to contact the movable abutment after the nut has moved away from its retracted position by a predetermined distance, such that the biasing member and abutment are carried by the nut as it moves towards its extended position.

4. An actuator as claimed in claim 1, wherein the tine component is non-rotating.

5. An actuator as claimed in claim 1, wherein the lock member is non-rotating.

6. An actuator as claimed in claim 1, wherein the tine fingers are arranged and configured to deflect in a radial direction away from the nut upon axial movement of the nut away from its retracted position.

7. An actuator as claimed in claim 6, wherein the formations comprise a ramped surface that deflect the tine fingers in the radial direction away from the nut upon axial movement of the nut away from its retracted position.

8. An actuator as claimed in claim 1, wherein the screw shaft is rotatable about an axis.

9. An actuator as claimed in claim 8, wherein the lock member is movable along the axis between the first position and the second position.

10. A thrust reverser actuation system ("TRAS") comprising an actuator as claimed in claim 1.

11. A thrust reverser actuation system ("TRAS") as claimed in claim 10, wherein the thrust reverser actuation system is not deployed when the nut occupies its retracted position, and the thrust reverser actuation system is deployed when the nut occupies its extended position.

12. A method of actuating a thrust reverser of an aircraft, comprising:
   providing a screw shaft and a nut translatable along the shaft between a retracted position and an extended position;
   securing the nut against axial movement when the nut occupies its retracted position by engaging formations on the nut with projections located on tine fingers of a tine component, and restricting radial movement of the tine fingers using a movable lock member in a first position;
   releasing the nut for axial movement by moving the lock member to a second position in which radial movement of the tine fingers is not restricted by the lock member;
   providing a biasing member between the lock member and the nut, wherein the lock member is resiliently biased towards the first position by the biasing member, wherein the biasing member is located concentrically around the nut and a movable abutment is provided between the biasing member and the lock member to bias the lock member towards the first position when the nut occupies its retracted position; and
   moving the lock member from the first position to the second position by means of an electromagnetic actuator.

* * * * *